United States Patent

Bohn et al.

[11] Patent Number: 5,916,954
[45] Date of Patent: Jun. 29, 1999

[54] FIBER REINFORCED VISCOELASTIC MATERIAL COMPOSITES FOR PASSIVE DAMPING

[75] Inventors: Jack R. Bohn, Rancho Palos Verdes; Teh Hwei Lee, Cerritos; Allen J. Bronowicki, Laguna Niguel, all of Calif.

[73] Assignee: TRW Inc., Redondo Beach, Calif.

[21] Appl. No.: 08/887,559

[22] Filed: Jul. 3, 1997

Related U.S. Application Data

[63] Continuation of application No. 08/304,629, Sep. 12, 1994, abandoned, which is a continuation of application No. 08/010,221, Jan. 27, 1993, abandoned.

[51] Int. Cl.[6] ........................................... C08K 3/00
[52] U.S. Cl. ..................... 524/494; 524/495; 524/496; 525/178; 525/183
[58] Field of Search ................................... 524/494, 495, 524/496; 525/178, 183

[56] References Cited

U.S. PATENT DOCUMENTS

| | | | |
|---|---|---|---|
| 4,311,751 | 1/1982 | Brueggemann et al. | 428/212 |
| 4,678,707 | 7/1987 | Shinozaki et al. | 428/323 |
| 5,118,562 | 6/1992 | Johnson et al. | 428/327 |
| 5,256,223 | 10/1993 | Alberts et al. | 156/71 |

*Primary Examiner*—Edward J. Cain
*Attorney, Agent, or Firm*—Michael S. Yatsko

[57] ABSTRACT

A coating composition and method are disclosed for reducing vibration and noise when applied to a structure such as in transportation and industrial equipment systems. The coating composition of the present invention includes a viscoelastic material with discrete stiff fibers suspended therewithin. The viscoelastic material is preferably selected from acrylics, silicones and polyurethanes, and the discrete fibers are preferably carbon fibers. The manipulation of the fiber volume fraction within the viscoelastic material, the dimension of the fibers, the orientation of the fibers within the composition and the fiber and viscoelastic material selections results in coating materials that enhance the reduction of vibration and noise

6 Claims, 4 Drawing Sheets

Scotchdamp Type 112

FIBER REINFORCED VISCOELASTIC MATERIAL COMPOSITES FOR PASSIVE DAMPING

This is a continuation of U.S. patent application Ser. No. 08/304,629, filed Sep. 12, 1994, which is a continuation of Ser. No. 08/010,221 filed Jan. 27, 1993 (both now abandoned).

BACKGROUND OF THE INVENTION

1. Technical Field

The present invention relates generally to damping materials and particularly concerns surface coatings that enhance the reduction of vibration and noise within existing structures when applied to the surface of such structures.

2. Discussion

The presence of unwanted vibration is a common problem in the design of structures which are subject to dynamic loads. This typically occurs in military and commercial transportation systems such as automobiles, trucks, aircraft, ships, spacecraft and other vehicles. The source of vibration may be acoustic or may emanate from rotating machinery or other mechanical devices. As the manufacturing materials for these systems have become lighter and stiffer, they have tended to become more susceptible and less able to suppress vibration and noise, and as such, the need for better dynamic stability and noise suppression has become apparent. Some development effort has been directed toward measuring and improving the intrinsic damping properties of state of the art composite materials. Significant improvements have not been achieved, however, because unwarranted compromise in the static elastic properties of the materials used would result.

Active and passive damping techniques have become the subject of recent experimentation to enhance performance in the areas of dynamic load reduction, vibration and noise reduction in composite structures. Fiber reinforced composites have been attractive lightweight substitutes for metals when high specific stiffness, strength and controlled expansion are required. These composites have been particularly effective for applications in commercial and military transportation systems. Although the tailorability of composites provides an effective means for design optimization of components which must be lightweight and must meet stressing thermal and mechanical systems requirements, these structures nevertheless experience undesirable levels of vibration and noise.

Vibration frequencies which typically occur in transportation applications are in the low frequency range, typically around ½–200 cycles per second. Noise frequencies typically occur throughout the range of human hearing capabilities, usually stated as from about 20 Hz to about 20,000 Hz.

Current methods for reducing vibration and noise throughout these systems involve the application of a viscoelastic material (VEM) to the external surface of the structure in the form of ancillary constraining layers of coatings or tapes, much like common adhesive tape in appearance. These constraining layers dampen vibration and noise by shifting the phase of loading from that of the underlying structure, through a combination of bulk tension/compression and localized shear deformation within the applied material at the underlying structure interface. The constraining layers thus provide a secondary dynamically responsive load path such that the static properties of the primary load carrying member are not appreciably altered.

In the use of such ancillary constraining layers, the properties of the viscoelastic materials are time dependent, such that they will not support any significant static load, but will react to oppose dynamic disturbances occurring within the structure to which the damping material is attached. Under quasi-static conditions the VEM will relax or creep to accommodate displacements in the load carrying member. During transient dynamic conditions the constraining VEM layer will suppress vibratory oscillations, depending on the geometry of the structure and the compliance of the VEM.

One type of current material applied to external surfaces of structures as a constraining layer for passive damping is a compliant VEM film adhered to a layer of stiff metal or composite foil, such as aluminum foil. This arrangement utilizes the compliancy of the VEM film to shift the phase of loading within the foil with respect to the loading in the primary structure.

The use of commercially available VEM materials and application techniques has resulted in a modest damping of vibration and noise, of a value generally less than 5%. One disadvantage of the use of VEM constraining layers as currently used is in the considerable weight added to the underlying structure, perhaps as much as 20–30%. Therefore, standard VEM constraining layer approaches do not offer great performance or weight efficiency for aircraft or spacecraft systems. This inefficiency arises typically from the manner in which the VEM is loaded, mainly in bulk tension/compression along with minimal localized shear at the constraining layer interfaces. In addition, the typical constraint material, such as aluminum, does not have the high stiffness to weight ratios available from fibers such as graphite.

The need therefore exists for an improved method for achieving high damping performance through the use of ancillary constraining layers of less material and weight.

SUMMARY OF THE INVENTION

In accordance with the teaching of a preferred embodiment of the present invention, a fiber reinforced viscoelastic coating composition for reducing vibration is provided. The composition of the present invention utilizes the suspension of discrete short fibers within the viscoelastic material. In comparison to the viscoelastic material, the fibers are very stiff so that shear deformation resulting from dynamic excitation in the underlying structure which is transmitted into the coating occurs mainly in the viscoelastic material at locations close to the fibers. The use of stiff fibers in combination with a viscoelastic material therefore provides a shear deformation mechanism for transmuting load throughout the VEM, as opposed to only at the coating-structure interface, so that decreased amounts of VEM will provide the same amount of damping currently requiring thicker coatings. Also, an increased amount of fiber-reinforced VEM can be utilized for increased damping, per unit area of contact with the static structure. The effect of the addition of these fibers is therefore to increase the stiffness of the VEM coating, thus enhancing the damping effect of the material by increasing the magnitude of shear deformation uniformly throughout the entire volume of the VEM coating. The dynamic load capacity of the coating is also increased as the coating stiffness is increased.

BRIEF DESCRIPTION OF THE DRAWING

The various advantages of the present invention will become apparent to one skilled in the art after reading the following specification and by reference to the drawings in which.

DETAILED DESCRIPTION OF THE PREFERRED EMBODIMENT

It should be understood at the outset that while this invention is described in connection with a particular example, the scope of the invention need not be so limited since those skilled in the art will appreciate that its teachings can be used in a much wider variety of applications than the examples specifically mentioned herein.

Figure 1:
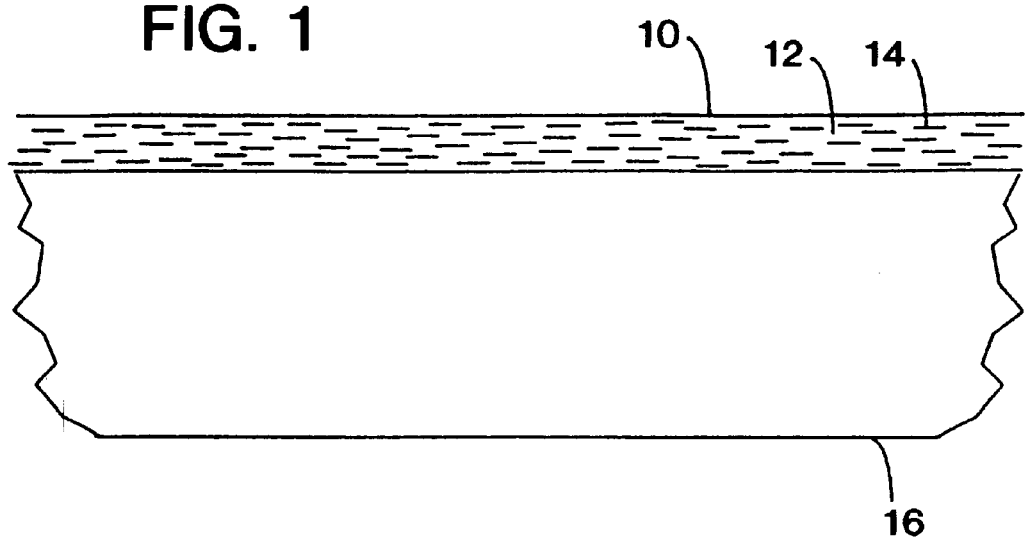
FIG. 1 is a cross-sectional view illustrating a fiber-reinforced viscoelastic material coating having fibers oriented in a single direction disposed therewithin, applied to the external surface of a structure or component.

A composition of the preferred embodiment of the present invention will now be described with reference to FIG. 1. More particularly, FIG. 1 is a cross-sectional view illustrating a coating composition, indicated generally at 10, applied to the external surface of a structural component 16. The coating composition 10 of the present invention is a viscoelastic material 12 with short discrete fibers 14 suspended therewithin.

In a preferred embodiment, viscoelastic material 12 is a highly compliant material selected from the group consisting of acrylics, silicones and polyurethanes. These viscoelastic materials may be commonly available commercial VEMs, chosen on the basis of availability and low cost. Further, the viscoelastic material used in the present invention is chosen to have favorable processability into a composite matrix. One important consideration in selecting a VEM for the present invention is its resistance to outgassing for space applications. It is well known that many conventional VEMs contain volatile hydrocarbon constituents which vaporize. This type of material must be avoided in VEMs to be used for space applications, to avoid the degradation of the VEM material.

The effectiveness of a viscoelastic material in many current applications is measured by its bulk tension/compression capabilities. For purposes of the present invention, however, the selection of a VEM is based on the shear deformation properties of the material. Shear deformation capability is critical for the composition of the present invention because the invention utilizes the suspension of discrete short fibers 14 within the viscoelastic material 12 to provide additional locations within the VEM beyond the VEM-underlying structure interface for the damping effect to take place. The fibers 14 provide stiffness within the highly compliant viscoelastic material 12 so that vibration resulting from dynamic loading in the underlying structure can be dampened by the coating composition applied thereupon. This damping is achieved in the composition of the present invention through shear deformation occurring mainly in the viscoelastic material 12 at locations close to the fibers 14. The fibers 14 therefore provide a network for transmuting load from the underlying structure throughout the VEM 12. Thus, it is most desirable that a VEM be chosen that is optimized for enhanced shear compliance.

The properties of the discrete fibers 14 are also important to the present invention. In one embodiment, these fibers are inexpensive conventional glass fibers. These fibers have a Young's Modulus ranging from about 10 million psi to about 20 million psi. While the use of glass fibers provides some damping of vibration and noise from the underlying structure 16, the performance of glass fibers is not considered high relative to other possible fiber selections. Glass fibers would be chosen primarily for their availability at low cost. An alternative selection is aramid fibers, such as Kevlar® fibers, available from E. I. duPont de Nemours & Co., Inc., of Wilmington, Del.

In a preferred embodiment, the fibers 14 dispersed within the viscoelastic material 12 are carbon graphite fibers. These fibers are chosen for their favorable stiffness, with Young's Modulus values of up to 120 million psi. Short fibers are used in the present invention to increase the shear stresses along the length of the fibers to the greatest extent possible. Preferred fiber length is selected based upon the frequency and amplitude of loading within the underlying structure 16.

Figure 2B:
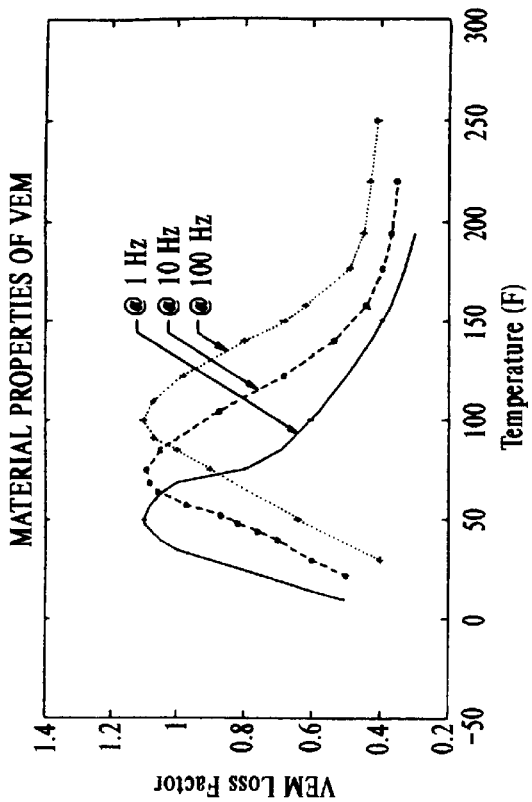
FIG. 2 is a 3-dimensional plot illustrating the dampening capability of a VEM as a function of frequency of vibration and temperature.
Figure 2A:
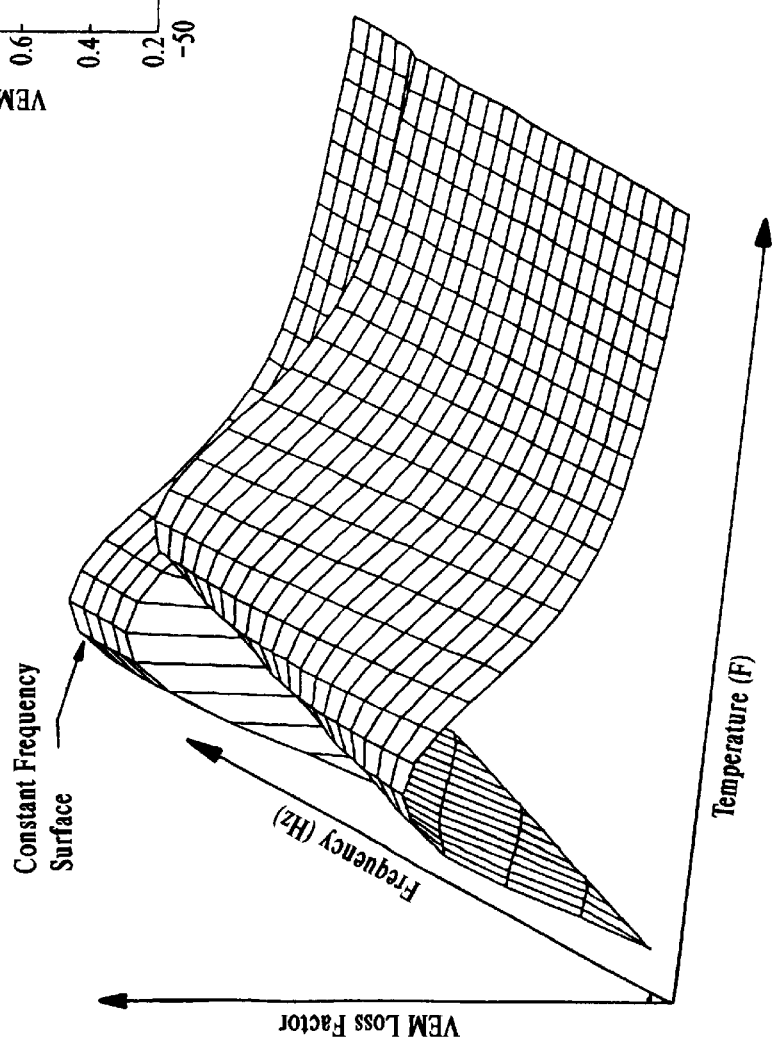
Figure 3:
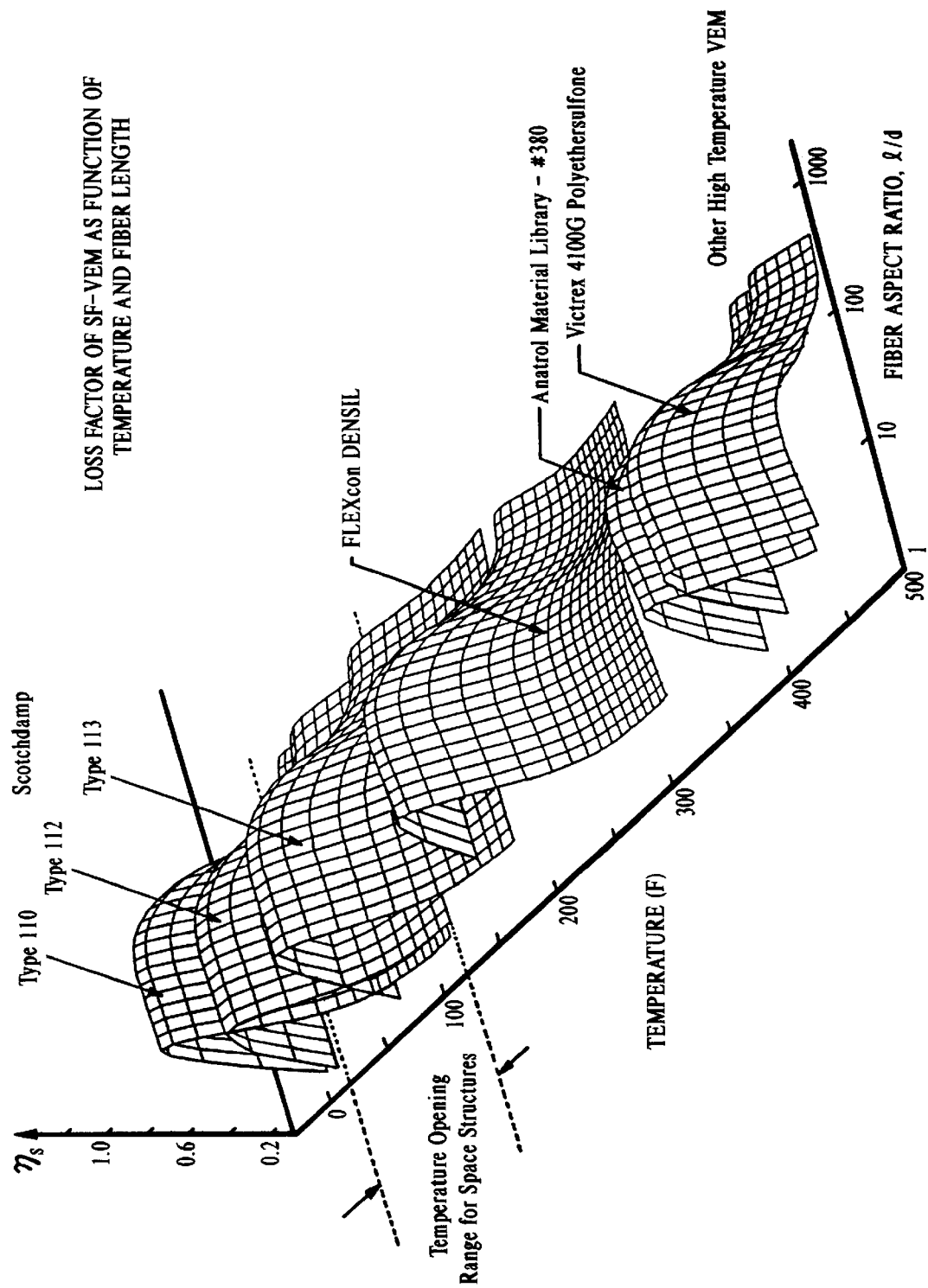
FIG. 3 is a 3-dimensional plot illustrating the dampening capability of a fiber-reinforced VEM as a function of fiber size and temperature, for several VEM selections.

Fiber length is selected based on the operating temperature and frequency of vibration of the underlying primary structure. FIG. 2 illustrates VEM loss factor, which represents the dampening capability of a VEM versus temperature and frequency of vibration. As may be seen in FIG. 2, for one selection of VEM called Scotchdamp Type 112, available from the 3M Corporation of St. Paul, Minn., the loss factor of the VEM is highly temperature dependent and moderately frequency dependent. The loss factor as a function of temperature and fiber aspect ratio, or the ratio of fiber length to fiber diameter for the composite short fiber-VEM system is shown in FIG. 3 for a number of VEM selections. These selections include Scotchdamp 110, 112 and 113, all available from 3M Corporation of St. Paul, Minn.; DENSIL, available from FLEXCON Corporation of Spencer, Mass.; Anatrol Material Library #380, available from Anatrol Corporation of Cincinnati, Ohio; and Victrex 4100G Polyethersulfone, available from Celanese Corporation of Charlotte, N.C.

Figure 4A:
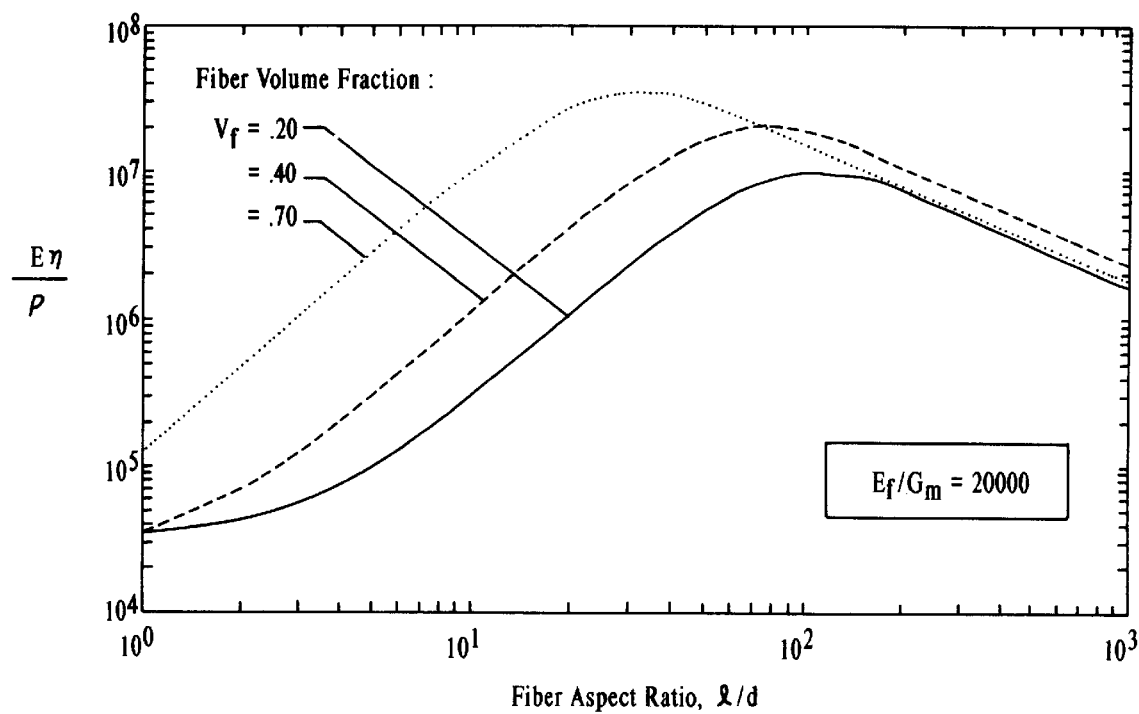
FIG. 4 is a dual graphical representation of a figure of merit for a fiber-reinforced VEM as a function of fiber size.
Figure 4B:
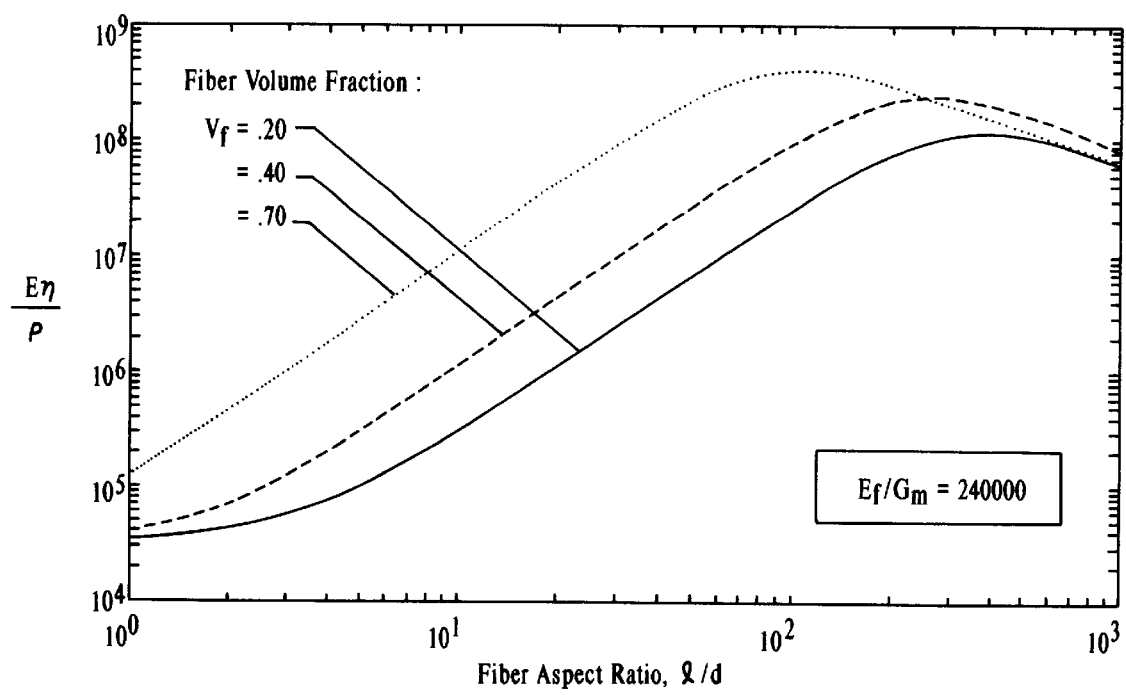

It may be seen in FIG. 3 that fiber aspect ratio is a strong determinant of loss factor, $\eta_s$. More particularly, for short fibers having smaller aspect ratios, the loss factor is highest. A converse relation exists, however, for stiffness. The effective modulus, E, increases with higher aspect ratio, i.e. for longer fibers. To choose the optimum fiber length, or aspect ratio, for achieving highest damping efficiency per unit weight of damping treatment, one maximizes a figure of merit based on the product of modulus and loss factor divided by density, $E\eta_s/\rho$. This figure of merit expresses the energy dissipating efficiency of the material per unit weight. An example is shown in FIG. 4 for two fiber-VEM combinations, one with a ratio of fiber axial modulus to matrix shear modulus, $E_f/G_m=20,000$ and the other for a ratio of $E_f/G_m=240,000$. The optimum fiber aspect ratio, l/d, is chosen at the maximum point of the curve $E\eta_s/\rho$, for a given fiber volume fraction, $v_f$.

In the case of fibers having an axial modulus $E_f$ of 70 million psi and VEM shear modulus $G_m$ of 3,500 psi, the ratio of fiber axial modulus to matrix shear modulus, $E_f/G_m$, is 20,000. Using the top graph of FIG. 4, the optimum fiber aspect ratio, l/d, is determined at the maximum point of the curve for a selected fiber volume fraction, $V_f$. For a fiber volume fraction of 40% in the same example as before, peak energy dissipation occurs at the optimum fiber aspect ratio l/d=80. This ratio is then used for determining the optimum fiber length for selected available fiber diameters. For fibers of diameter 10 microns, an l/d ratio of 80 yields a fiber length l of 800 microns, or 0.032 inch. It should be noted that under the above approach, different fiber dimensions will be optimal for different temperatures and vibration frequencies, as the VEM properties change.

A simpler and quicker but less accurate means of choosing the optimum fiber length is to use a closed form solution for standard constrained layer treatments, as described in the paper, "Length Optimization for Constrained Layer Damping," by R. Plunkett and C. T. Lee, published in the Journal of the Acoustical Society of America, Volume 48, 1970, pages 150–161. This publication is incorporated herein by reference. The formula for selecting optimum fiber length under this solution is $$l_{optimum} = 3.28\sqrt{t_v d\, E_f/G_m}$$

where $t_v$ is the average VEM thickness between fibers and d is average fiber diameter.

The fibers used in the present invention typically have a length of from about 1/320 inch to about 1/2 inch and preferably from about 1/10 inch to about 1/4 inch. The carbon fibers preferred in the present invention typically have a diameter of about 10 microns. In alternative embodiments, any fibers may be used, with preferred fibers exhibiting high degrees of stiffness, having Young's Modulus values of from about 30 million psi to about 120 million psi.

Figure 5:
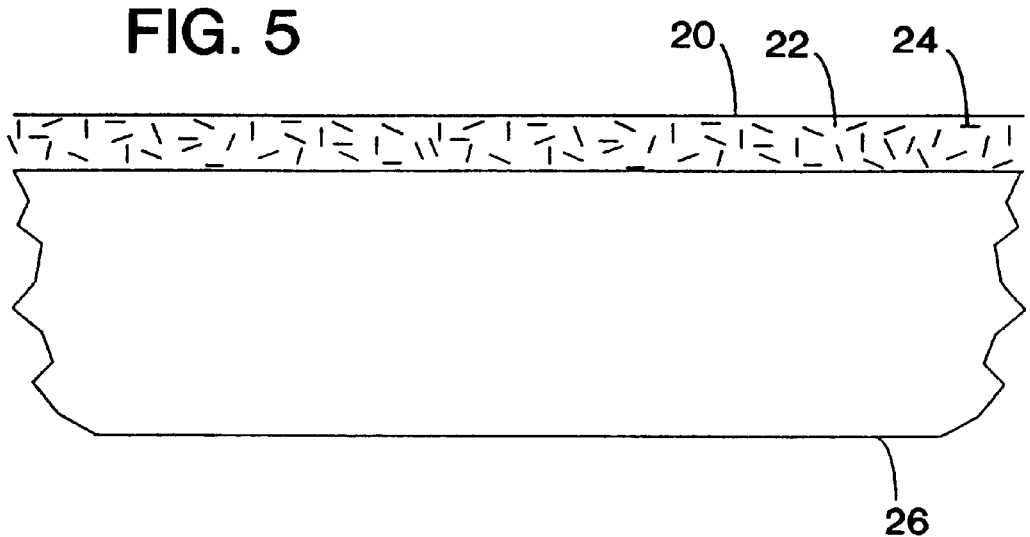
FIG. 5 is a cross-sectional view illustrating a fiber reinforced viscoelastic material coating having randomly-oriented fibers disposed therewithin applied to the external surface of a structure or component.

The alignment and orientation of the discrete fibers 14 within the viscoelastic material 12 is an important design feature for the coating composition of the present invention. Preferably, the fibers 14 are cast within the viscoelastic material 12 so that the fibers are aligned with the direction of applied stress during dynamic loading. In FIG. 1, the discrete fibers 14 disposed within viscoelastic material 12 are oriented in a substantially parallel relation and are further oriented substantially parallel to the plane of the surface of underlying component 16. Maximum shear is achieved within the coating composition through the alignment of all fibers disposed therein in a substantially parallel direction. Present methods for dispersing fibers within a viscoelastic material in an uncontrolled fashion incorporate the fibers in random orientations and at random locations therewithin. FIG. 5 illustrates this embodiment of a coating composition 20, applied to a structural component 26, wherein discrete fibers 24 are dispersed within a viscoelastic material 22 in random orientations and at random locations. Without wishing to be bound by theory, the inventors believe that a majority of the discrete fibers 24 disposed within the VEM 22 up to about 90% of the fibers 24 could potentially be oriented in the same direction within the VEM 22.

Figure 6:
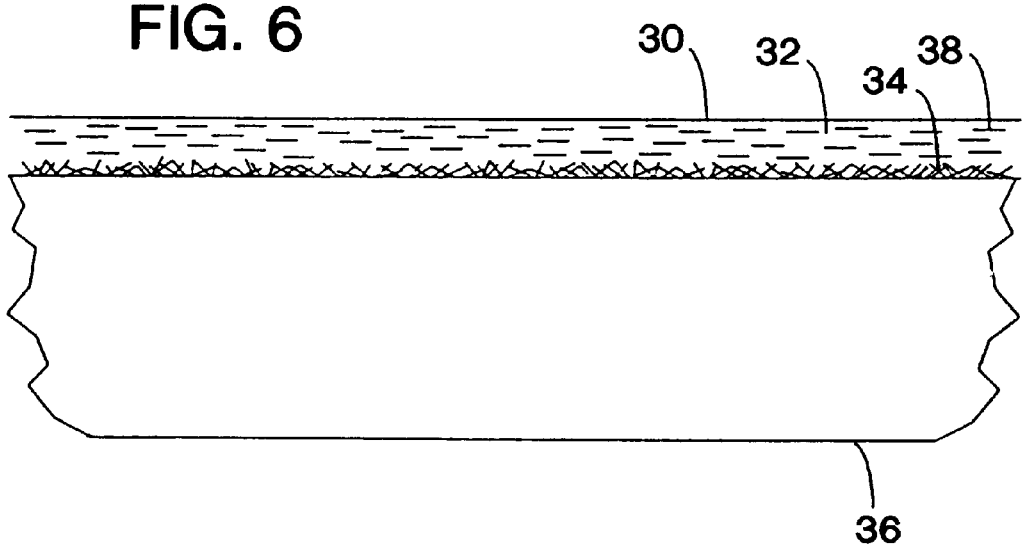
FIG. 6 is a cross-sectional view illustrating a fiber-reinforced viscoelastic material coating having fibers in contact with the underlying structure or component and additional fibers disposed therewithin.

An additional design optimization consideration is the degree of contact between the discrete fibers and the underlying structure. The inventors believe that greater direct contact between the underlying structure and the fibers disposed within the VEM will result in a greater transfer of vibration into the coating material, and thus, a greater opportunity to affect a damping of the vibration. This is accomplished in a preferred embodiment by forming the coating composition with a large number of discrete fibers extending inwardly to the VEM from the VEM-underlying structure interface. The fibers dispersed throughout the remainder of the coating composition are then oriented to suit the particular damping requirements. In a preferred embodiment, illustrated in FIG. 6, a coating composition 30 is provided wherein a portion of the discrete fibers 34 within the VEM 32 are positioned in a substantially contacting relation with the underlying structure 36 in similar form to a nap on a rug, wherein the fibers branch out in multiple directions from singular or substantially adjacent multiple positions along the coating-underlying structure interface. The remaining fibers 38 are dispersed within the remainder of the VEM 32, preferably in a substantially parallel relation, as shown.

The volume fraction of the discrete fibers within the viscoelastic material is typically from about 0.20 to about 0.70. Preferable volume fractions of discrete fibers are from about 0.40 to about 0.60. The selection of a fiber volume fraction is based on a balance between achieving a high stiffness in the coating composition and greater dynamic load capacity through the use of higher fiber volume fractions, while lower fiber volume fractions allow greater distances between fibers, and thus, may be easier to fabricate. Having a greater proportion of VEM will also allow the material to adhere better to the primary structure.

The use of a coating composition of the present invention is advantageous because it provides greater vibration and noise damping per unit thickness of coating composition applied to a structure. In a preferred embodiment of this invention, the applied thickness of the coating composition of the present invention is from about 1/1000 inch to about 1/30 inch. The thinner coatings of the present invention provide large amounts of damping with small overall weight contributions to the underlying structure. Such weight efficiency is also favorable because in alternative embodiments, two or more layers or thin films of the present coating composition can be applied sequentially to a structure for increased damping efficiency with lower weight contributions than were possible through the use of other types of ancillary constraining layers. In addition, multiple layers of fiber-reinforced viscoelastic material may be applied whose individual layers contain VEMs having different shear deformation properties and fibers disposed therewithin having different stiffness properties, different sizes and different volume fractions. The use of these multiple constraining layers provides an effective way for damping vibration and noise of different frequencies and at different operating temperatures. When multiple coating composition layers are used, vibrations of different frequencies tend to pass through each constraining layer not effective for damping of each particular frequency until their outward travel through the multiple constraining layers external to the structure reaches the particular layer optimized for damping of each particular vibration or noise.

The coating composition of the present invention therefore provides an ancillary coating material for reducing vibration and noise within a structure. Further, the coating composition of the present invention overcomes weight inefficiencies and low effectiveness disadvantages associated with non-fiber-reinforced viscoelastic materials. The coating composition of the present invention further increases the damping and suppression efficiency of viscoelastic material coatings as applied to existing structures.

It is also possible to utilize the coating compositions of the present invention within other mechanical systems prone to vibration excitation, such as precision rotating systems, for example, machine tools, disk drives and drive shafts.

While the above detailed description describes a preferred embodiment of the present invention, it will be understood that the description is exemplary in nature and is not intended to limit the scope of the invention. The present invention will therefore be understood as susceptible to modification, alteration and variation by those skilled in the art without deviating from the scope and meaning of the following claims.

What is claimed is:

1. A coating comprising a plurality of layers for reducing vibration when applied to a structure, at least one layer being in direct contact with said structure, each layer comprising:

a viscoelastic material selected from the group consisting essentially of acrylics, silicones and polyurethanes; and a plurality of discrete fibers suspended within said viscoelastic material, said discrete fibers being selected from the group consisting essentially of carbon fibers, glass fibers and aramid fibers;

wherein at least a portion of said discrete fibers suspended within said viscoelastic material of at least one layer in direct contact with said structure are in direct contact with said structure and wherein at least two of said layers have a different property selected from the group consisting of shear deformation, stiffness, thickness. viscoelastic volume fraction and fiber volume fraction.

2. A coating comprising a plurality of layers for reducing vibration when applied to a structure, at least one layer being in direct contact with said structure, each layer comprising:

a viscoelastic material selected from the group consisting essentially of acrylics, silicones and polyurethanes; and a plurality of discrete fibers suspended within said viscoelastic material, said discrete fibers being selected from the group consisting essentially of carbon fibers, glass fibers and aramid fibers;

wherein at least a portion of said discrete fibers suspended within said viscoelastic material of at least one layer in direct contact with said structure are in direct contact with said structure and wherein at least two of said layers are effective for damping vibration of different frequencies.

3. A coating comprising a plurality of layers for reducing vibration when applied to a structure, at least one layer being in direct contact with said structure, each lager comprising:

a viscoelastic material selected from the group consisting essentially of acrylics, silicones and polyurethanes; and a plurality of discrete fibers suspended within said viscoelastic material, said discrete fibers being selected from the group consisting essentially of carbon fibers, glass fibers and aramid fibers;

wherein at least a portion of said discrete fibers suspended within said viscoelastic material of at least one layer in direct contact with said structure are in direct contact with said structure and wherein at least two of said layers are effective for damping vibration at different operating temperatures.

4. A coating comprising a plurality of layers for reducing vibration when applied to a structure at least one layer being in direct contact with said structure, each layer comprising:

a viscoelastic material selected from the group consisting essentially of acrylics, silicones and polyurethanes; and a plurality of discrete fibers suspended within said viscoelastic material, said discrete fibers being selected from the group consisting essentially of carbon fibers, glass fibers and aramid fibers;

wherein at least a portion of said discrete fibers suspended within said viscoelastic material of at least one layer in direct contact with said structure are in direct contact with said structure, wherein at least one layer is suitable for allowing a substantial amount of vibration at a particular frequency to pass through said layer, and wherein at least one other layer is effective for damping a substantial amount of said vibration at said particular frequency.

5. The composition according to claim 1 wherein at least a portion of said fibers within at least one layer in direct contact with said structure branch out in multiple directions from singular positions along an interface between said composition and said structure.

6. The composition according to claim 1 wherein at least a portion of said fibers within at least one layer in direct contact with said structure branch out in multiple directions from substantially adjacent multiple positions along an interface between said composition and said structure.

* * * * *